US005881281A

United States Patent [19]
Gates et al.

[11] Patent Number: 5,881,281
[45] Date of Patent: *Mar. 9, 1999

[54] METHOD AND APPARATUS FOR AUTOMATICALLY LOADING CONFIGURATION DATA ON RESET INTO A HOST ADAPTER INTEGRATED CIRCUIT

[75] Inventors: Stillman F. Gates, Los Gatos; Paresh M. Borkar, Fremont, both of Calif.

[73] Assignee: Adaptec, Inc., Milpitas, Calif.

[ * ] Notice: The term of this patent shall not extend beyond the expiration date of Pat. No. 5,727,207.

[21] Appl. No.: 956,224

[22] Filed: Oct. 21, 1997

Related U.S. Application Data

[63] Continuation of Ser. No. 301,463, Sep. 7, 1994, Pat. No. 5,727,207.

[51] Int. Cl.$^6$ ..................................................... G06F 13/00
[52] U.S. Cl. ........................ 395/651; 395/681; 395/828; 395/559
[58] Field of Search ..................................... 395/681, 651, 395/652, 653, 559, 551, 828, 830, 829, 831, 834

[56] References Cited

U.S. PATENT DOCUMENTS

| | | | |
|---|---|---|---|
| 5,226,040 | 7/1993 | Noble, III et al. | 370/56 |
| 5,243,274 | 9/1993 | Kelsey et al. | 324/158 |
| 5,274,783 | 12/1993 | House et al. | 395/325 |
| 5,319,754 | 6/1994 | Meinecke et al. | 395/325 |
| 5,367,647 | 11/1994 | Coulson et al. | 395/325 |
| 5,452,424 | 9/1995 | Goeppel | 395/650 |
| 5,459,867 | 10/1995 | Adams et al. | 395/700 |
| 5,479,618 | 12/1995 | Van de Steeg et al. | 364/167.01 |
| 5,555,438 | 9/1996 | Blech et al. | 395/850 |
| 5,657,455 | 8/1997 | Gates et al. | 395/280 |
| 5,659,690 | 8/1997 | Stuber et al. | 395/309 |

OTHER PUBLICATIONS

BusLogic Inc., BT–946C Fast SCSI PCI Host Adapter, Installation Guide, pp. 1–1 through 1–4, 2–1 through 2–7, 3–1 through 3–14, 4–1 through 4–5, 5–1 through 5–2 and A–1 through A–4 (1994).

BusLogic, Inc., BT–946C Bus Master Fast SCSI Adapter for PCI Local Bus, 1 page (1994).

Future Domain Corporation, 18C30 SCSI IC Technical Reference Manual, pp. 1–1 through 1–3, 2–1 through 2–10, 3–1, 3–3, 3–4 through 3–33, 4–1 through 4–12, 5–1 through 5–10, 6–1 and 7–1 (Jul. 28, 1993).

Future Domain Corporation, 36C70 SCSI IC Technical Reference Manual, pp. 1–1 through 1–2, 2–1 through 2–6, 3–1 through 3–18, 4–1 through 4–12, 5–1 through 5–8, 6–1 and 7–1 (Nov. 1993).

*Primary Examiner*—Kevin A. Kriess
*Attorney, Agent, or Firm*—Skjerven, Morrill, MacPherson, Franklin & Friel LLP

[57] ABSTRACT

Configuration data indicative of interface requirements for interfacing to a host adapter card are automatically serially loaded on reset from an external device on the card into a host adapter integrated circuit on the card. A driver program can then read the configuration data from the host adapter integrated circuit and thereby determine how to interface with the host adapter card.

14 Claims, 10 Drawing Sheets

METHOD AND APPARATUS FOR AUTOMATICALLY LOADING CONFIGURATION DATA ON RESET INTO A HOST ADAPTER INTEGRATED CIRCUIT

This application is a continuation of application Ser. No. 08/301,463, filed Sep. 7, 1994 now U.S. Pat. No. 5,727,207.

FIELD OF THE INVENTION

The present invention relates to host adapter integrated circuits. More particularly, the present invention relates to host adapter integrated circuits which have a PCI bus interface for communication with a host.

BACKGROUND INFORMATION

FIG. 1 is a simplified block diagram of an architecture of a personal computer comprising a host 1, a CD ROM 2, a disk drive 3, a printer 4, and three host adapter cards 5–7. Host 1 comprises a CPU 8, a main memory 9 containing software for the CPU, a local bus 10 interconnecting the CPU and the main memory, a bridge 11, an ISA bus 12, and three card edge connectors 13–15. The card edge connectors 13–15 are designated "slots" in the figure. Host 1 also comprises a decoder 16 which outputs three address enable signals 17–19, one to each of the host adapter cards 5–7. A host adapter integrated circuit is disposed on each host adapter card.

The three host adapter cards 5–7 have different features and capabilities. Host adapter card 5 provides an interface for a single ended 8-bit SCSI bus for communication with CD ROM 2, host adapter card 6 provides an interface for a single ended 16-bit SCSI bus for communication with disk drive 3, and host adapter card 7 provides an interface for a differential 8-bit SCSI bus for communication with printer 4. The host adapter card 7 interfacing with printer 4 may have a relatively small buffer which is written by CPU 8 with data to be printed whereas host adapter card 6 may have a relatively large buffer which stores data to be read from disk 3 as well as data to be written to disk 3. A driver program residing in main memory 9 must therefore be able to determine the different interfacing requirements of the various cards in slots 13–15 so that the host can correctly interface to those different cards.

Not only must the driver software be able to determine the interfacing requirements of the different cards plugged into the slots 13–15, but it is desired to realize the different host adapter cards using one host adapter integrated circuit layout. If, for example, a single manufacturer produces two types of cards 5 and 6, the manufacturer can realize considerable cost savings associated with producing two different integrated circuits if the same integrated circuit layout is used on both types of cards.

Accordingly, host adapter cards 5 and 6 use the same type of host adapter integrated circuit. Because the host adapter integrated circuits are identical at the silicon level, the driver software cannot read different configuration data from a hardwired register located at a predetermined address inside the integrated circuits. The hardwired contents of such registers would be identical. An additional external register is therefore provided which can be read by the driver software.

Host adapter card 5, for example, comprises a host adapter integrated circuit 20 and an external register 21 coupled to slot 13. Similarly, host adapter card 6, for example, comprises a host adapter integrated circuit 22 and an external register 23 coupled to slot 14. The driver program in main memory 9 reads register 21 from a predetermined and fixed address (using address enable signal 17) and determines from the contents of register 21 information on the requirements for interfacing with card 5. Similarly, the driver reads register 23 from another predetermined address (using address enable signal 20) and determines from the contents of register 23 information on the requirements for interfacing with card 6. Host adapter integrated circuits 20 and 22 therefore can be identical integrated circuits.

If the bus which couples the host 1 to the adapter cards 5–7 is now upgraded from an ISA bus to a PCI bus, a problem arises. The PCI bus specification does not generally permit more than one load to be present on a terminal of a slot. In card 5, there are two loads on a terminal of slot 13, one load for the register 21 which is also coupled to slot 13, and a second load for the host adapter integrated circuit 20 which is coupled to slot 13. A different scheme is therefore required for supplying configuration information to the driver program when a PCI bus is used.

A second scheme is illustrated in connection with host adapter card 7 and host adapter integrated circuit 24. Host adapter integrated circuit 24 has a plurality of terminals 25, each which is soldered to Vcc or ground on the printed circuit board. The driver program reads a register at a predetermined address in host adapter integrated circuit 24 (using the address enable signal 19) and obtains therefrom configuration information determined by the setting of the terminals 25. If there are four such terminals, then there is a total of sixteen possible different configurations that can be selected. To increase the number of configurations supportable by the host adapter integrated circuit 24 using this scheme, more terminals must be provided on the integrated circuit package thereby incurring additional costs and space associated with providing more terminals.

A scheme of providing different configuration information from two different host adapter cards having identical host adapter integrated circuits is therefore desired which overcomes problems associated with existing schemes.

SUMMARY

On or shortly after a reset condition, configuration data is automatically loaded in serial fashion from a serial data input terminal of the host adapter integrated circuit into the host adapter integrated circuit. The host can then read this configuration data (or in some embodiments configuration data derived at least in part from this configuration data) from a register located inside the host adapter integrated circuit. Different host adapter cards having different interface requirements can therefore supply different configuration data to the host while using identical host adapter integrated circuits.

In some embodiments, a serial device (such as a shift register, the individual bits of which have been programmed or are initialized by the reset condition) external to the host adapter integrated circuit is coupled to the host adapter integrated circuit. The host adapter integrated circuit reads the contents of the external device by outputting a clock signal onto a clock output terminal of the host adapter integrated circuit. This clock output terminal is coupled to the clock input lead of the external device so that consecutive bits of the configuration data from the external device are clocked out of the external device, onto a data input terminal of the host adapter integrated circuit, and into a shift register located inside the host adapter integrated circuit.

In some embodiments, a comparator determines whether the configuration data in the shift register has a predetermined value. A default configuration value is initially loaded into a register which is accessible from the host. If the configuration data in the shift register has a predetermined value (for example, "OFF"), then the register accessible from the host is not changed, thereby leaving the register loaded with the default configuration value. If, on the other hand, the configuration data does have the predetermined value, then the register is loaded with the configuration data in the shift register. In some embodiments, a pullup or pulldown resistor is coupled to the data input terminal of the host adapter integrated circuit so that the predetermined value (for example, "FF") will be shifted into the shift register in the event that no external device is coupled to the data input terminal. In some embodiments, which of two default configuration values is loaded into the externally accessible register is determined by a digital value received from another input terminal of the host adapter integrated circuit.

In some embodiments, the clock output terminal has a dual function. First, a clock signal is supplied onto the clock output terminal to clock the external device to load the configuration data serially. Second, after the serial loading of the configuration data, a signal indicative of activity on a parallel bus (for example, a SCSI bus coupled to the host adapter integrated circuit) is driven onto the clock output terminal. A light emitting diode (LED) coupled to the clock output terminal therefore flickers indicating SCSI bus activity.

In some embodiments, the host adapter integrated circuit communicates with a disk drive via a Fibre Channel interface. Information on the Fibre Channel can be obtained from Global Engineering, 15 Inverness Way East, Englewood, Colo. 80112. The document entitled "Fibre Channel-Physical And Signaling Interface (FC-PH)" revision 4.2, is incorporated herein by reference.

DETAILED DESCRIPTION OF THE PREFERRED EMBODIMENTS

Figure 1:
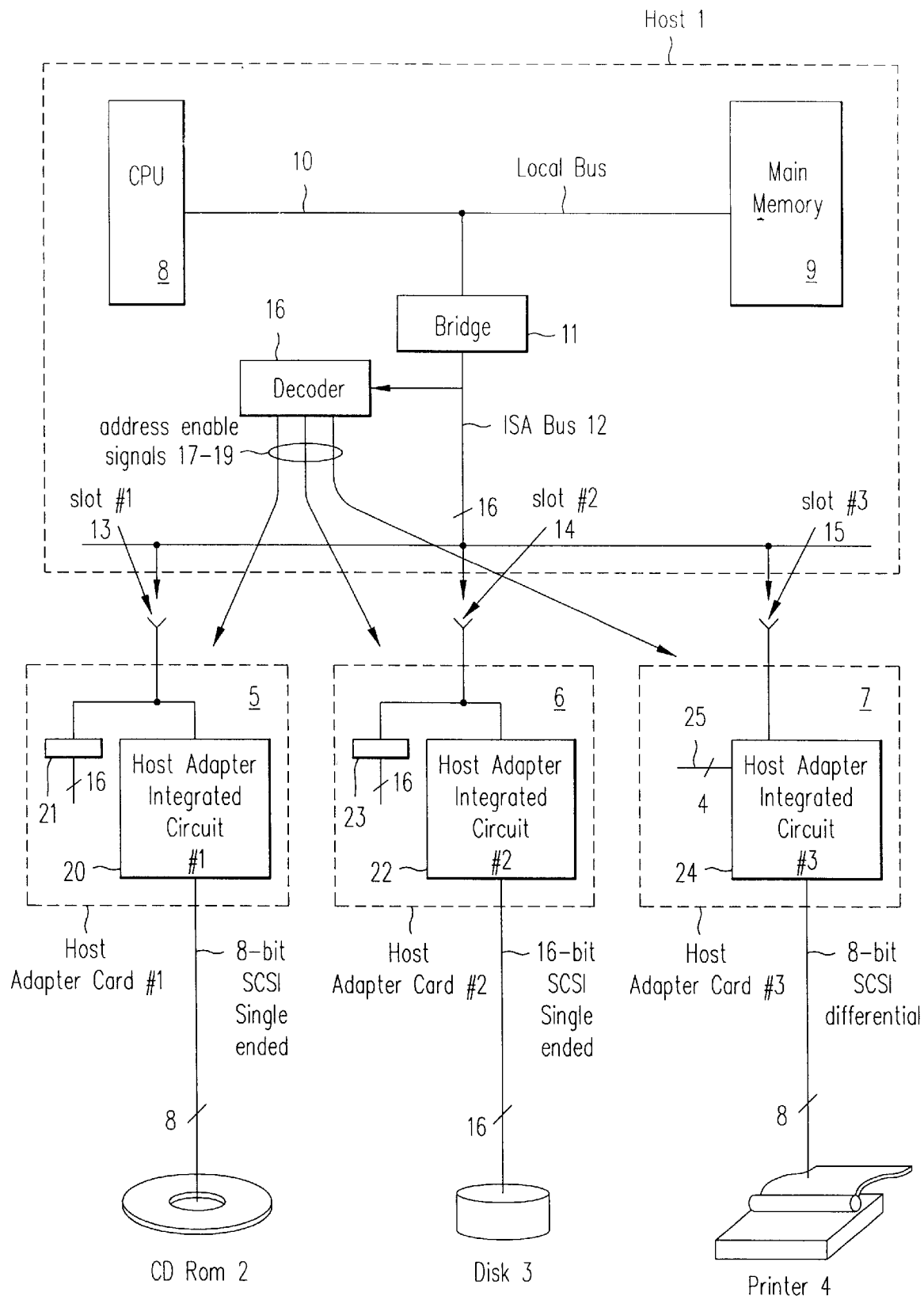
FIG. 1 is a block diagram showing a host coupled to three host adapter cards having different interface requirements.
Figure 2:
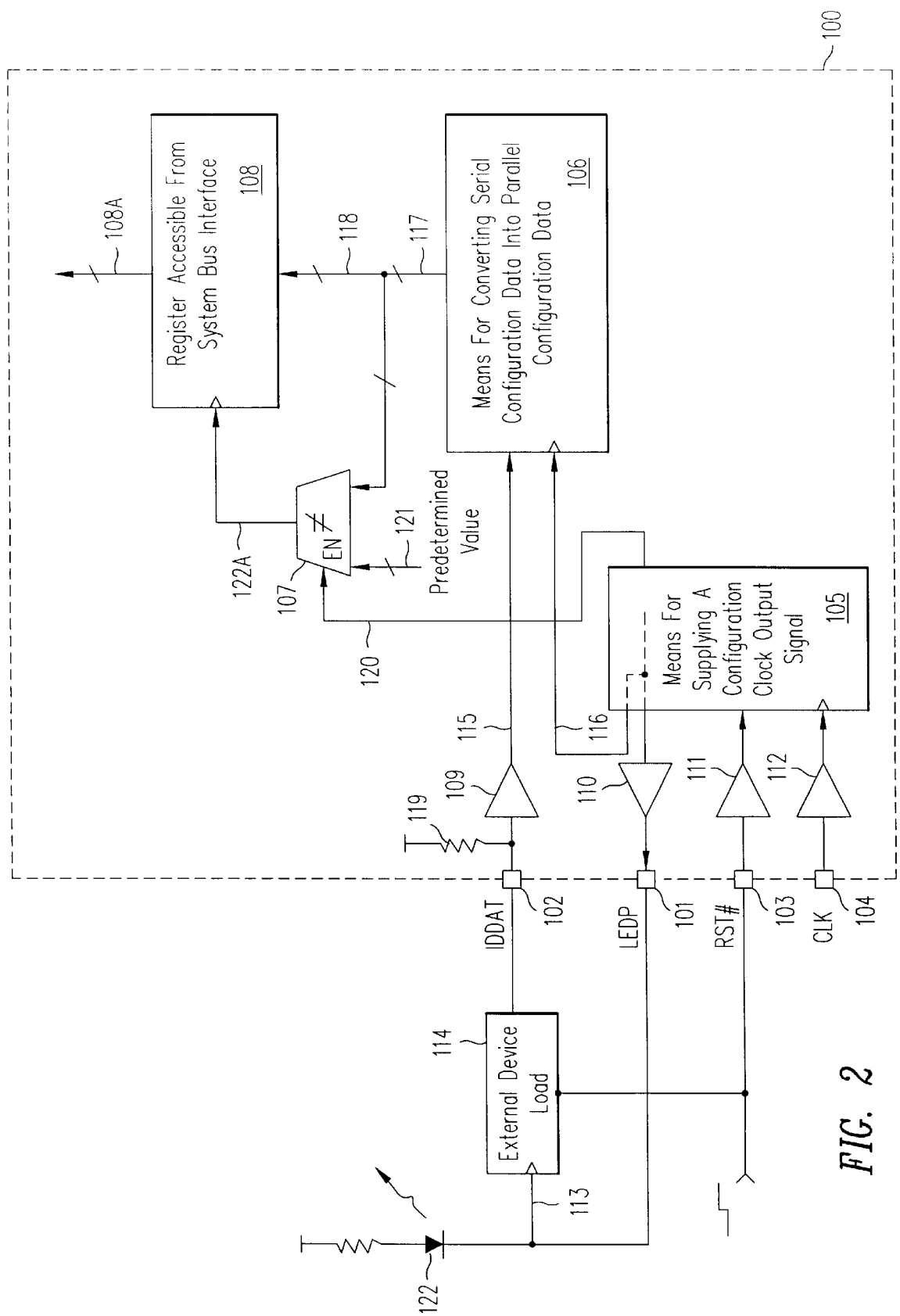
FIG. 2 is a simplified block diagram of a circuit on a host adapter integrated circuit which serially loads configuration data from an external device in accordance with an embodiment of the present invention.
Figure 3A:
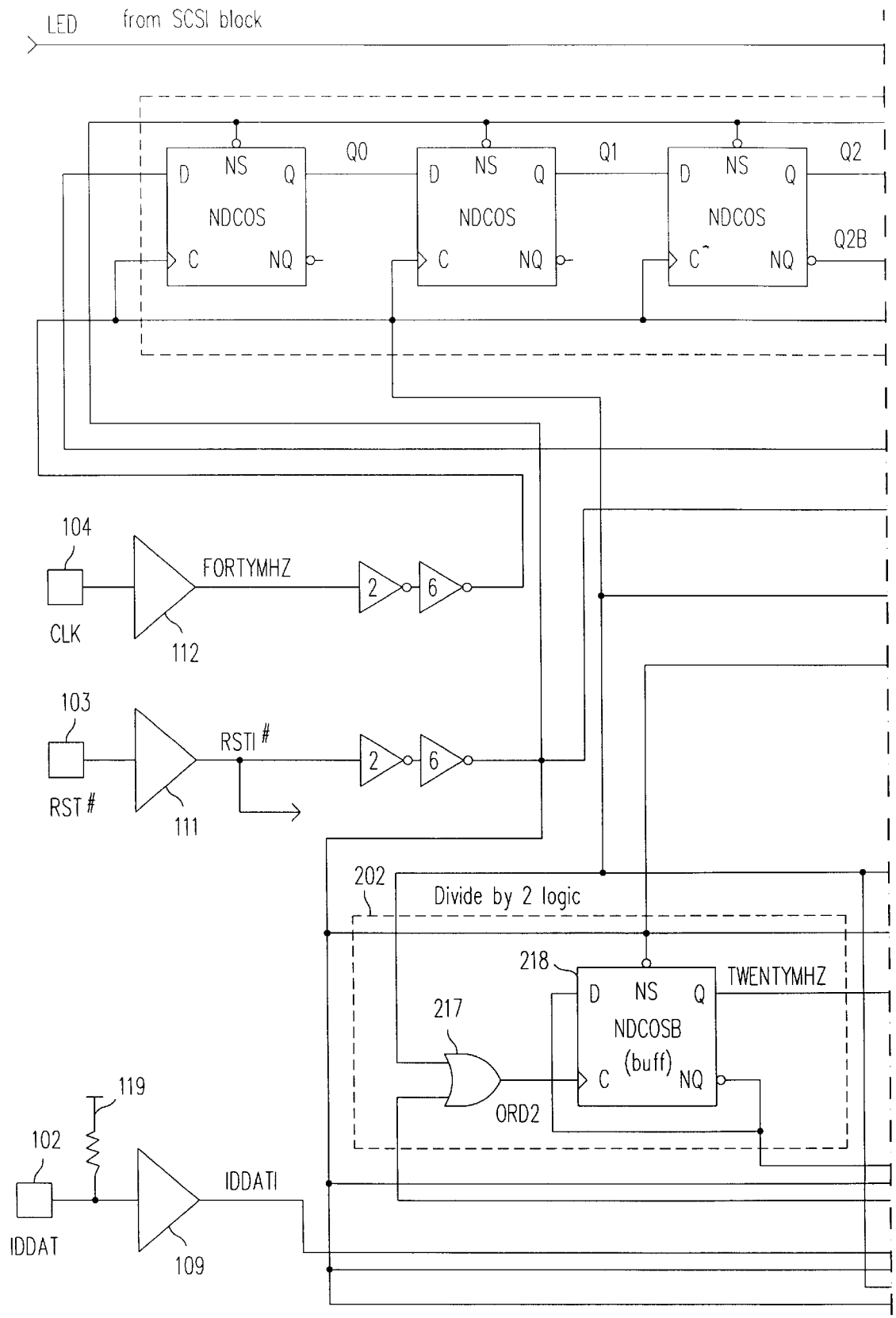
FIGS. 3 and 4 respectively show how FIGS. 3a, 3b, 3c, and 3d and 4a and 4b form circuit diagrams in accordance with embodiments of the present invention.
Figure 3B:
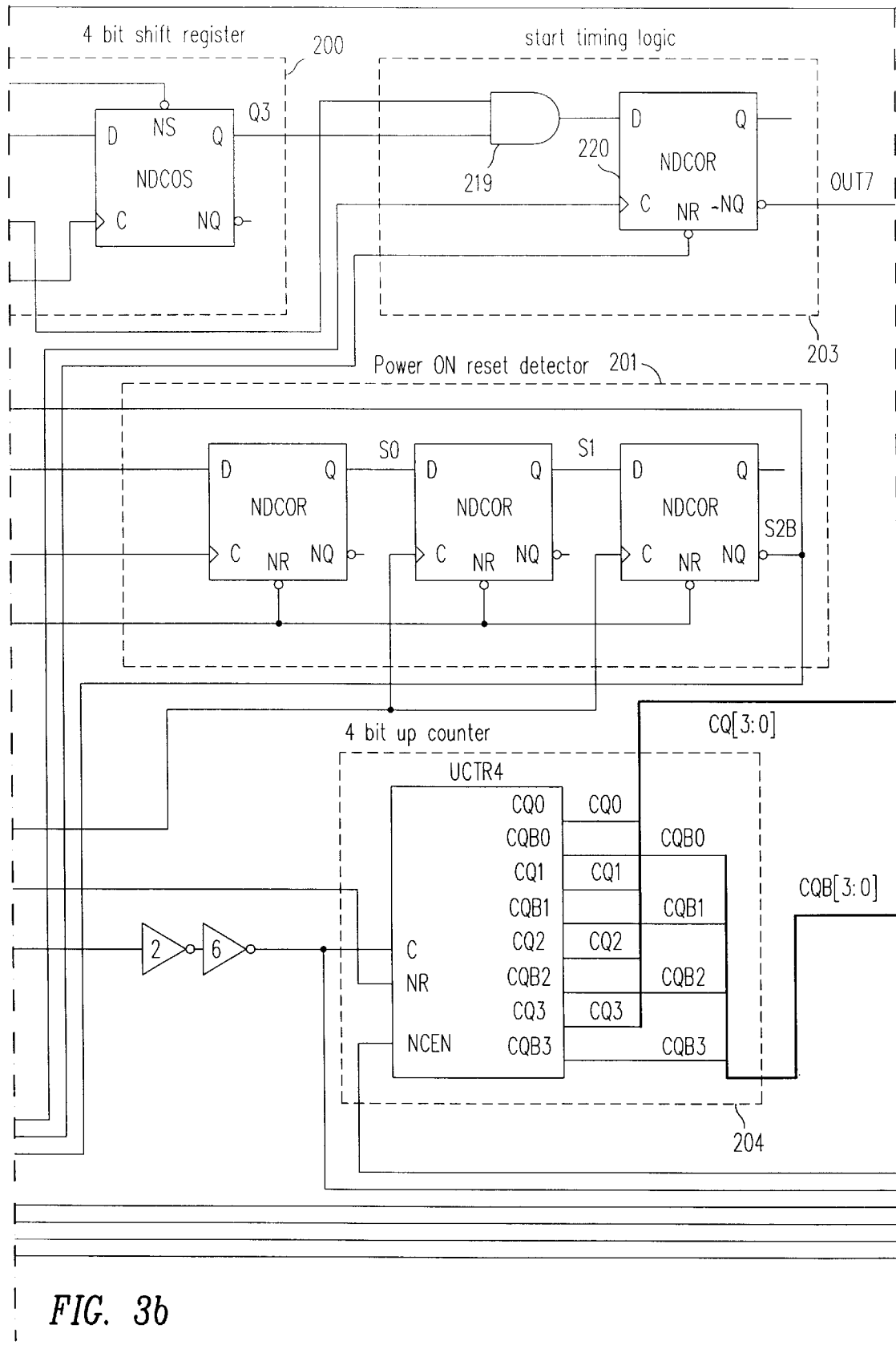
Figure 3C:
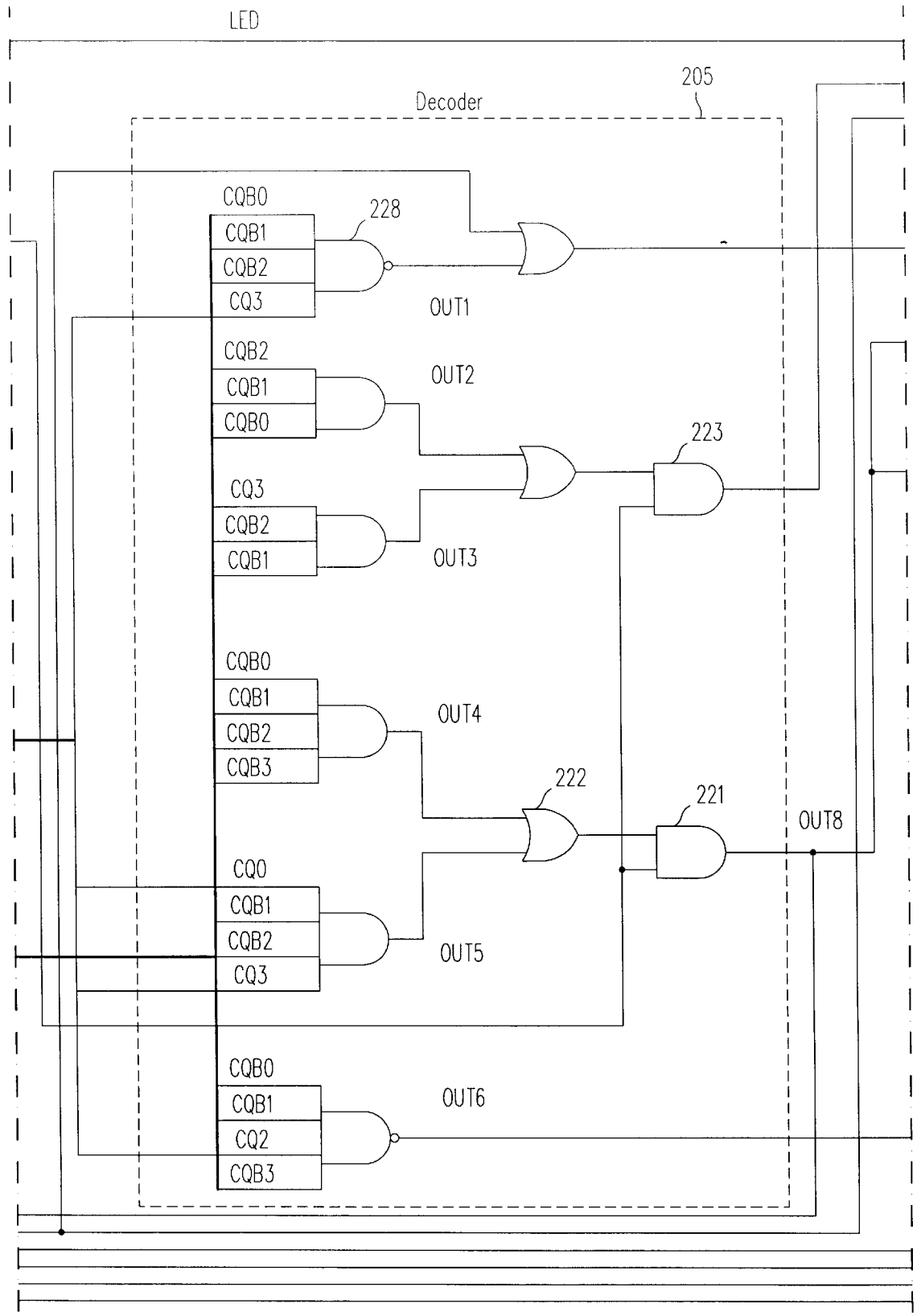
Figure 3D:
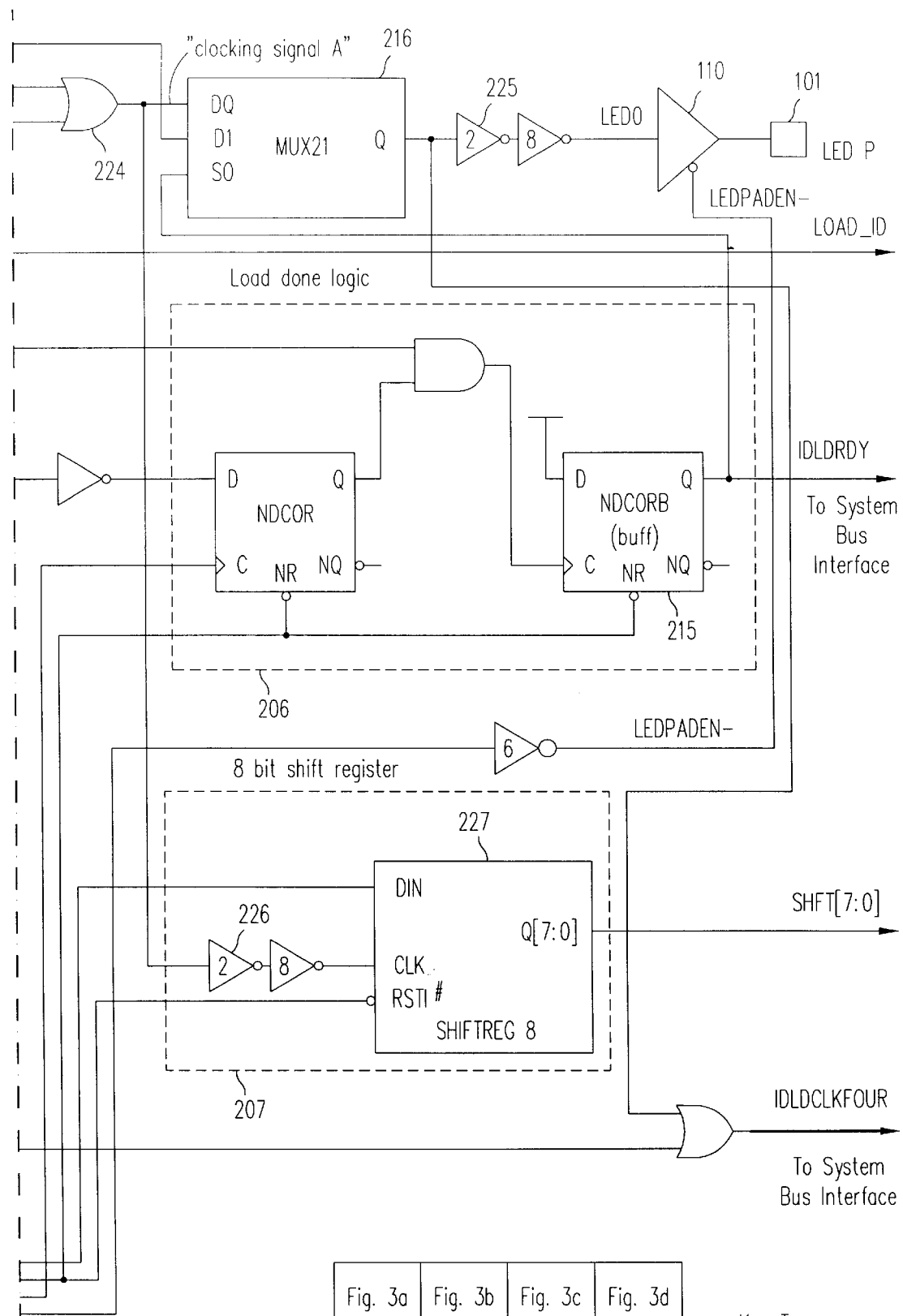

FIG. 2 is a simplified block diagram in accordance with an embodiment of the present invention. A host adapter integrated circuit 100 comprises a system bus interface such as a PCI bus (not shown) for coupling to a host, a configuration clock output terminal 101, a configuration data input terminal 102, a reset input terminal 103, a clock input terminal 104, means for supplying a configuration clock output signal onto the configuration output terminal 105, means for converting serial configuration data into parallel configuration data 106, a comparator block 107, and a device identification register which is accessible from the system bus 108. Buffers 109–112 are also provided.

The reset signal received on terminal 103 is active low. When the reset signal transitions high, means 105 generates a configuration clock output signal via buffer 110 onto configuration clock output terminal 101. A clock input lead 113 of an external device 114 (for example, 16R8 type programmable device which is initialized by RST#) is coupled to configuration clock output terminal 101 so that serial configuration data from the external device 114 is serially output onto an output lead of external device 114. This serial configuration data passes through buffer 109 and is supplied to a serial data input of means 106 via conductor 115. Means 105 supplies a clock signal on conductor 116 to clock each successive bit of the serial configuration data into means 106. After all the serial bits of the new configuration data are clocked into means 106, the new configuration data is present in parallel form on the output leads 117 of means 106 and on conductors 118. The configuration data in means 106 can be accessed from the system bus interface via conductors 108A and register 108. Accordingly, different host adapter cards having different interfacing requirements can have identical host adapter integrated circuits but different external devices. The configuration data supplied by the particular external device of a card is indicative of the interface requirements of that card.

In accordance with some embodiments of the present invention, it is desired that no external device 114 be provided for the most common host adapter card configuration. An internal pullup resistor 119 is therefore coupled to the configuration data input terminal 102. If no external device 114 is provided, resistor 119 maintains a digital one on conductor 115 for all bits clocked into means 106 and a parallel value of all digital ones will be present on conductors 118. After all the bits of the configuration data are clocked into means 106, means 105 enables comparator block 107 via conductor 120. Comparator block 107 compares the configuration value on conductors 118 with a predetermined value (in this case all digital ones) on conductors 121. In some embodiments, the comparator function of block 107 is realized using decoding so that a predetermined value need not be supplied as an input to block 107.

If the configuration data on conductors 118 are not all ones (not the predetermined value), then comparator block 107 causes register 108 to be loaded via conductor 122A with the configuration data on conductors 118. This would correspond with the situation in which a configuration value of other than all ones is serially loaded from external device 114. If, however, the configuration value on conductors 118 is all ones (the predetermined value), then register 108 is not loaded. Accordingly, a default configuration value previously loaded into the register 108 upon reset remains in register 108.

In accordance with some embodiments of the present invention, a light emitting diode (LED) 122 is coupled to configuration clock output terminal 101. After register 108 is loaded with the appropriate configuration data, means 105 multiplexes another signal onto terminal 101. A signal received from a SCSI block (not shown) of the host adapter integrated circuit may, for example, be multiplexed onto terminal 101. Accordingly, LED 122 appears to flicker in accordance with SCSI bus activity. Aspects of this LED 122 are described in further detail in U.S. Pat. No. 5,657,455, entitled "Status Indicator For A Host Adapter" filed Sep. 7, 1994, the subject matter of which is incorporated herein by reference.

Figure 4A:
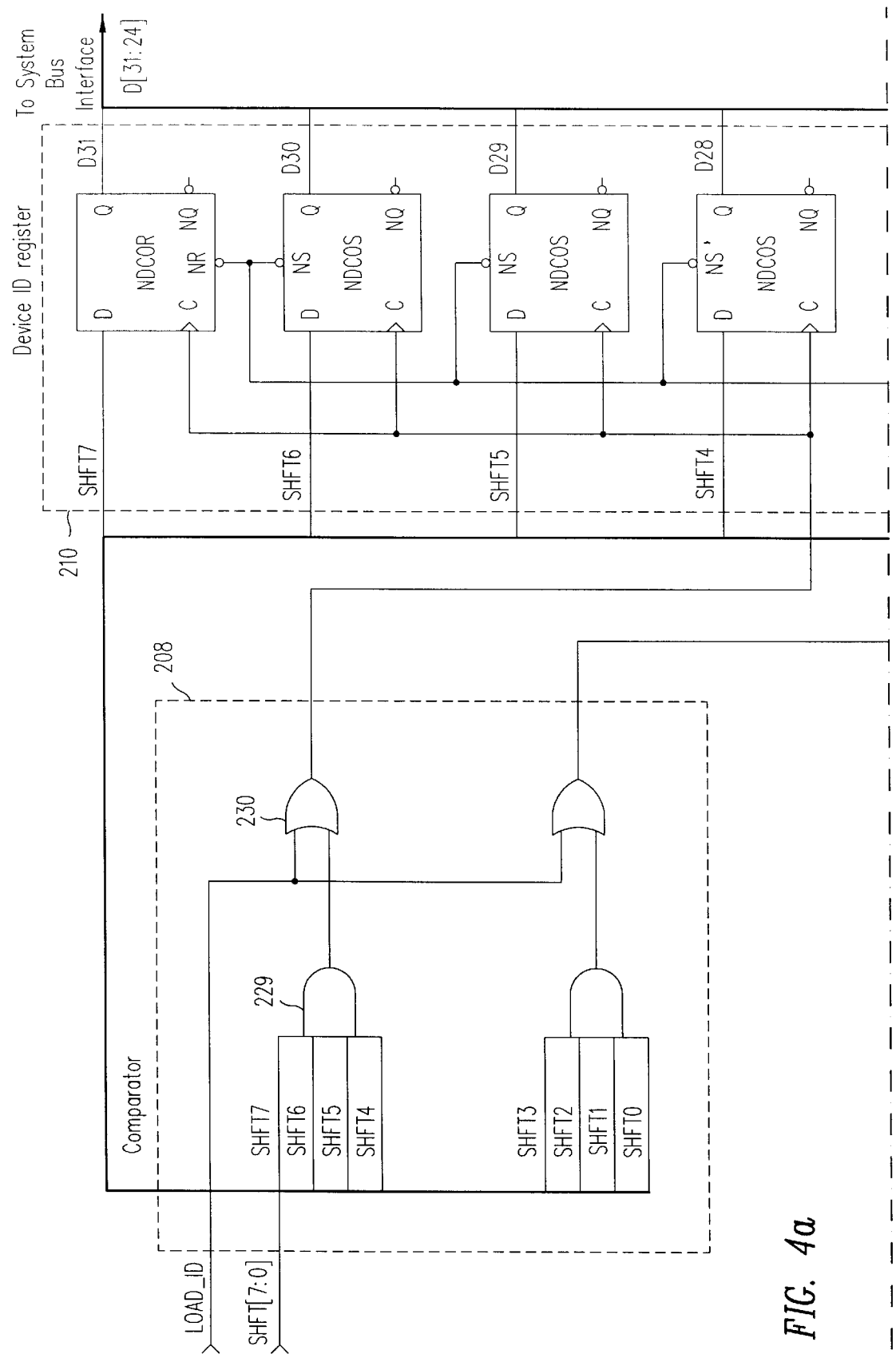
Figures 4, 4B:
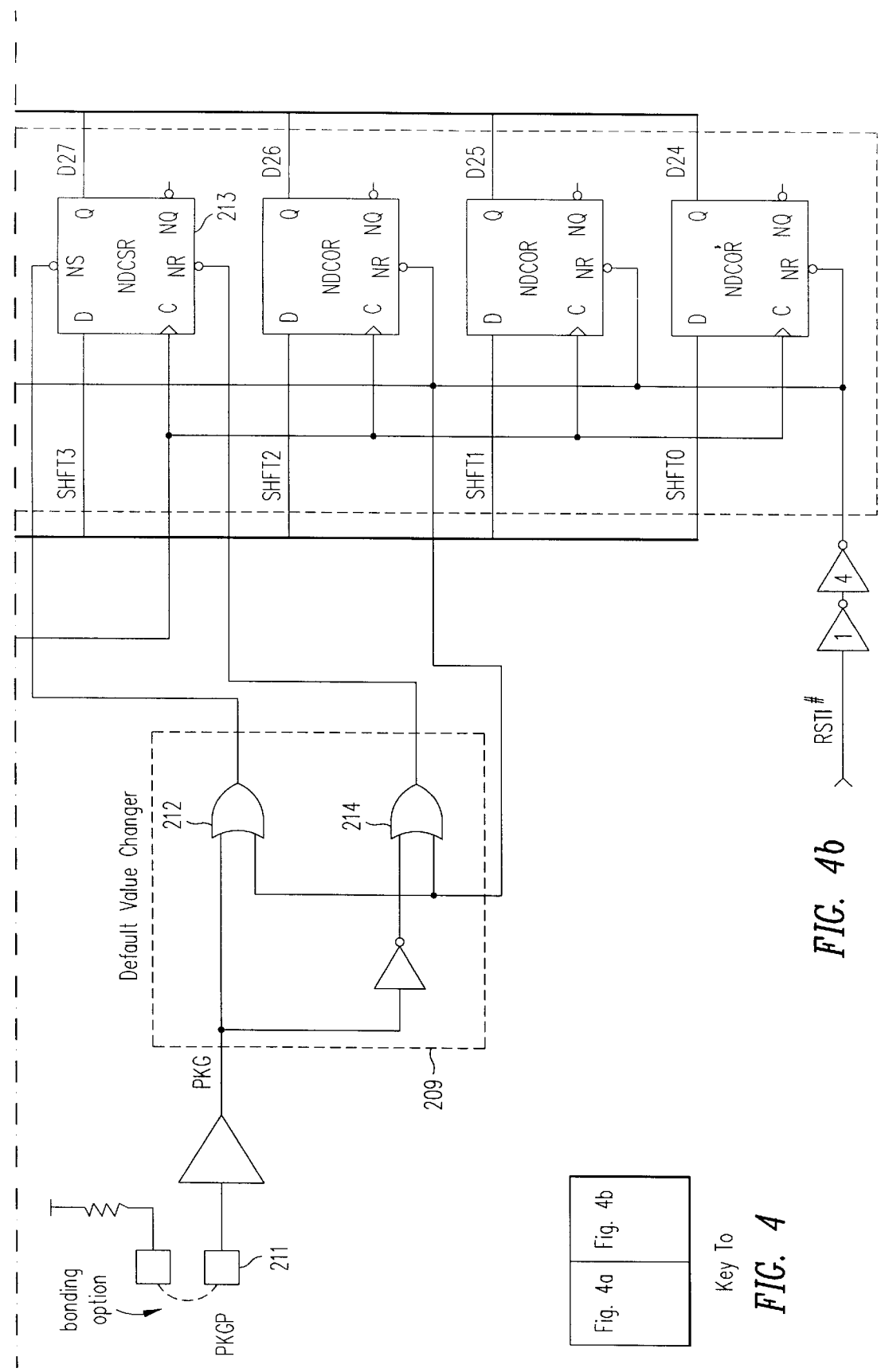

FIGS. 3 and 4 are a detailed circuit diagram of a circuit in accordance with an embodiment of the present invention.

The circuit comprises a 4-bit shift register 200, a power on reset detector 201, divide by two logic 202, start timing logic 203, a 4-bit up counter 204, a decoder 205, load done logic 206, an 8-bit shift register 207, a comparator block 208, a default value changer 209, and an externally accessible device identification register 210. An operation of the circuit of FIGS. 3 and 4 is explained in connection with the waveforms of the timing diagram of FIG. 5.

During the period of time between times t0 and t1, the active low reset signal RST# received by the host adapter integrated circuit on reset terminal 103 is low. Accordingly, all sequential elements of the circuit are forced to known states. Device ID register 210, for example, is asynchronously loaded with the default configuration value. Whereas some of the bits of the device ID register 210 are forced to their default values by being asynchronously cleared or set, others are either cleared or set depending on the value present on PKGP terminal 211. If, for example, a digital low is present on PKGP terminal 211, then OR gate 212 outputs a digital low to the preset input lead of flip-flop 213 when the reset signal RSTI# is low, thereby setting flip-flop 213. If, on the other hand, is digital high is present on terminal 211 PKGP, then OR gate 214 outputs a digital low to the clear input lead of flip-flop 213 when the signal RSTI# is low, thereby clearing flip-flop 213. The default configuration value in device identification register 210 is therefore "70" hex if a digital high is present on terminal PKGP and is "78" hex if a digital low is on terminal PKGP.

Shortly before time t1, the reset signal on terminal 103 transitions high. Internal reset signal RSTI# transitions high at time t1. Signal LEDPADEN-therefore transitions low to enable output buffer 110. Because flip-flop 215 of the load done logic 206 is cleared, the select input lead of multiplexer 216 causes multiplexer 216 to couple an output of decoder 205 and control gate 224 to output buffer 110 rather than the signal LED received from the SCSI block of the host adapter integrated circuit.

Figure 5:
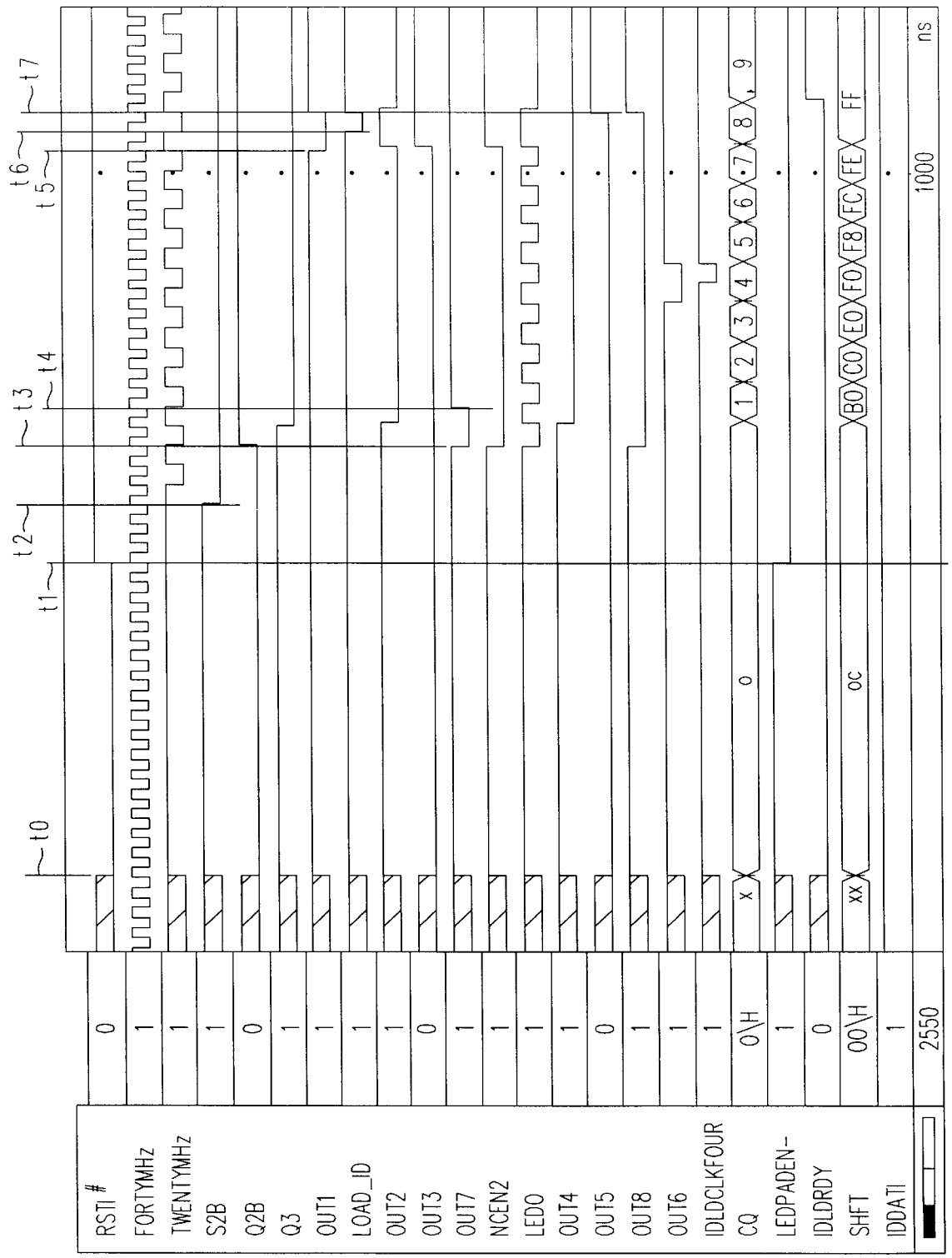
FIG. 5 is a waveform diagram representative of an operation of the circuit of FIGS. 3 and 4.

At time t2, after the flip-flops of the power on reset detector are no longer cleared by the reset signal, the signal S2B output from the power on reset detector transitions low on the third rising edge of the 40 Hhz clock signal. The high to low transition of signal S2B permits OR gate 217 of the divide by two logic to transfer the 40 MHz clock signal to the clock input lead C of flip-flop 218. Flip-flop 218 therefore toggles on the rising edges of the 40 Mhz clock to generate a 20 Mhz clock signal. As illustrated in FIG. 5 by waveform CQ, the 4-bit counter 204 remains at count "0" because its active low count enable input NCEN is supplied with a digital high from gate 221 signal OUT8.

At time t3, the decoder 205 outputs a low start pulse OUT7 to start the counter 204 incrementing. The data input lead of the four bit shift register 200 is coupled to receive the signal S2B from the power on reset detector 201. As shown in FIG. 5, signal S2B transitions low at time t2. Accordingly, signal Q2B output from the 4-bit shift register transitions high three 40 Mhz clock periods later. When signals Q2B and Q3 output from the 4-bit shift register are both high, AND gate 219 of the start timing logic 203 outputs a digital high. Flip-flop 220 of the start time logic 203 therefore clocks in a digital high on the next rising edge of the 20 Mhz clock signal to pulse signal OUT7 low. Signal OUT7 is supplied to an input lead of AND gate 221 of decoder 205, thereby causing the OUT8 signal output from AND gate 221 to transition low as illustrated by the OUT8 waveform of FIG. 5. This enables counter 204.

When the digital low shifts from the third bit to the fourth bit of 4-bit shift register 200, AND gate 219 outputs a digital low. Flip-flop 220 therefore clocks in a digital low and signal OUT7 transitions high at time t4. The counter 201 (which has now incremented one) is no longer disabled via the decode signal OUT4 output to OR gate 222. Accordingly, counter 201 continues to increment.

Signal OUT7 is also coupled to AND gate 223 of the decoder 205 whose output Q coupled to gate 224 goes low, thereby allowing the 20 MHz clock signal to pass through OR gate 224. The 20 MHz "clocking signal A" is coupled through multiplexer 216, buffer 225, and output buffer 110 to terminal 101. Clocking signal A is also coupled through buffer 226 to the clock input lead of an 8-bit shift register 227 of block 207. As illustrated by waveform LED0 in FIG. 5, the signal has eight rising edges. Accordingly, a rising edge can clock a bit of the configuration data into shift register 227 from configuration data input terminal 102 while the next bit of configuration data is clocked out of an external device and onto the configuration data input terminal 102 for clocking into the shift register 227 on the next rising edge.

At time t5, NAND gate 228 of decoder 205 decodes the count state "8" and pulses signal OUT1 to a digital low. At the high to low transition of this signal OUT1, the shift register 227 has been clocked eight times and contains the configuration value from configuration data input terminal 102. The upper four bits of the configuration value in shift register 227 is therefore compared with a predetermined value (in this case a "F" hex). In the embodiment illustrated, this comparison is actually a decode and is performed by AND gate 229. If the contents of the four most significant bits of shift register 227 are high, then AND gate 229 outputs a digital high and it is desired to leave the four most significant bits of device identification register 210 loaded with their default value. If, on the other hand, the contents of the four most significant bits of shift register 227 are not all high, then it is desired to load the four most significant bits of device identification register 210 with the contents of the four most significant bits of shift register 227.

Accordingly, a pulse signal LOAD_ID is generated which transitions low at time t6 after the signal output from AND gate 229 is stable. Signal LOAD_ID is generated by gating the decode signal OUT1 with the 20 Mhz signal so that LOAD_ID only transitions low when the 20 Mhz signal is low.

If the signal output from AND gate 229 is high at time t6 when LOAD_ID pulses low, then the signal output from OR gate 230 will remain a digital high and the four uppermost bits of device identification register 210 will not be clocked. If, on the other hand, the signal output from AND gate 229 is low at time t6 when LOAD_ID pulses low, then the clock signal supplied to the four most significant bits of the device identification register 210 will pulse low, the configuration value from shift register 227 being clocked into device identification register 210 on the rising edge of the LOAD_ID pulse. The contents of the least significant bits of the shift register 227 are compared and selectively loaded into the least significant four bits of device identification register 210 in similar fashion.

Once the counter 204 has counted to the state "9" hex, the counter 204 is stopped. Signal OUT8 from decoder 228 transitions high at time t7, thereby disabling counter 204. As illustrated in FIG. 5, counter 204 remains at count "9" after time t7.

After the configuration clock output terminal 101 has been used to clock the external device eight times as required to load the eight bits of configuration data into the host adapter integrated circuit, the terminal 101 may be used to output various signals such as the signal LED from the SCSI block (not shown) so that LED 122 will flash indicating SCSI bus activity. As illustrated in FIG. 5, signal OUT8 transitions to a digital high at t7 after the shifting of shift register 227 is complete. Accordingly, the load done logic 206 detects the rising edge of signal OUT8, causes the signal IDLDRDY to transition to a digital high, and causes multiplexer 216 to couple the signal LED onto output terminal 101.

An additional signal IDLDCLKFOUR needed by the system bus interface to sample the state of another input signal RAMPS- (RAM present) to host adapter integrated circuit is also generated. The sequence illustrated in FIG. 5 represents an operation in which no external device is provided for connection to input IDDAT 102, the voltage on configuration data input terminal 102 being maintained at a digital high by pullup resistor 119 (waveform IDDATI in FIG. 5 remains at a digital high), the comparator block 208 detecting the predetermined value "FF" hex, and the device identification register 210 remaining loaded with one of the two default configuration values as determined by the setting of the PKGP terminal 211.

Figure 6:
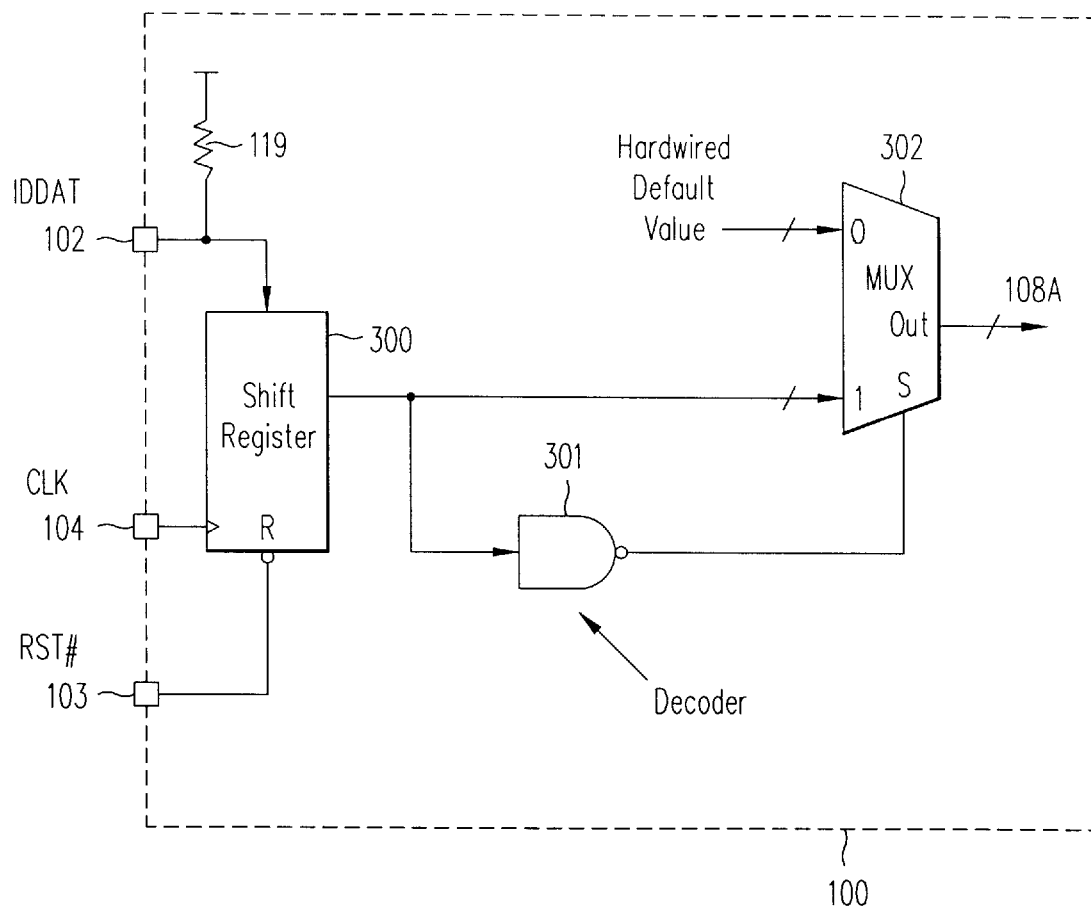
FIG. 6 is another embodiment in accordance with the present invention.

FIG. 6 is another embodiment in accordance with the present invention. Host adapter integrated circuit 100 comprises a shift register 300, a decoder 301 which in this case is a NAND gate, and a multiplexer 302 which in this case is a plurality of 2-to-1 multiplexers. Multiplexer 302 multiplexes either a multi-bit hardwired default value on input leads 0 to corresponding output leads or multiplexes a multi-bit parallel value on input leads 1 to the corresponding output leads. Serial configuration data is received on input terminal IDDAT 102 and is shifted into shift register 300 by a configuration clock signal received on clock input terminal CLK 104. During the power on reset period, a low reset signal received on reset input terminal RST# 103 resets the contents of shift register 300. Once the configuration data is shifted into shift register 300, decoder 301 detects whether that shifted data is a predetermined value (in this case all ones). If the data is the predetermined value, then decoder 301 outputs a digital zero thereby selecting the hardwired default value to be output onto the output leads of multiplexer 302. A circuit similar to the means 105 of FIG. 2 is provided in some embodiments to drive a clock output terminal 101 of the host adapter integrated circuit 100 with a clock signal to clock the serial configuration data out of an external device, such as external device 114 of FIG. 2.

For additional information pertaining to host adapter cards and host adapter integrated circuits, the reader is referred to copending U.S. Pat. No. 5,659,690, entitled "Programmably Configurable Host Adapter Integrated Circuit Including A RISC Processor", to Stuber et al.

Although the present invention has been described in connection with certain exemplary embodiments, the present invention is not limited thereto. An occurrence other than a transition of a reset signal may be used to initiate serial loading of configuration data from an external device. Configuration data may be loaded during the time a reset signal is asserted in some embodiments. In some embodiments, the device identification register is serially loaded directly from a configuration data input terminal and no additional shift register and comparator is provided. Numerous different state machines can be employed to serially load configuration data from a device external to the host adapter integrated circuit in accordance with the present invention. Numerous types of serial external devices, including ROM, PAL, fuse, and antifuse devices, may be employed. The number of bits of data serially loaded need not match the number of bits in the device identification register. There may be numerous device identification registers and the device identification registers can have uses other than indicating device identity and configuration. It is to be understood, therefore, that various changes, modifications, and combinations of features of the described embodiments may be practiced without departing from the scope of the invention as set forth in the appended claims.

We claim:

1. A method of loading configuration data after a reset condition into a host adapter integrated circuit from an external device, comprising:

receiving a reset signal on a first terminal of a host adapter integrated circuit, said host adapter integrated circuit being operatively coupled to a host; and upon a deassertion of said reset signal, automatically outputting a clock signal from a second terminal of said host adapter integrated circuit to said external device such that configuration data is clocked out of said external device and into a third terminal of said host adapter integrated circuit, said reset signal remaining deasserted throughout said loading of said configuration data, said configuration data not being transferred from said host to said host adapter integrated circuit.

2. The method of claim 1, wherein the external device is taken from the group consisting of: a ROM, a PAL, a fuse device, and an antifuse device.

3. A system, comprising:

a host;

a first storage device storing first configuration data and having a first terminal and a second terminal; and a first host adapter integrated circuit operatively coupled to said host, said first host adapter integrated circuit outputting a clock signal to said first terminal of said first storage device such that said first configuration data from said first storage device is output from said second terminal of said first storage device and is loaded serially into said first host adapter integrated circuit, said first configuration data being indicative of a first set of interface requirements;

a second storage device storing second configuration data and having a first terminal and a second terminal; and a second host adapter integrated circuit operatively coupled to said host, said second host adapter integrated circuit outputting a clock signal to said first terminal of said second storage device such that said second configuration data from said second storage device is output from said second terminal of said second storage device and is loaded serially into said second host adapter integrated circuit, said second configuration data being indicative of a second set of interface requirements, said first and second host adapter integrated circuits being substantially identical integrated circuits.

4. The method of claim 3, wherein the first storage device and the second storage device are taken from the group consisting of: a ROM, a PAL, a fuse device and an antifuse device.

5. A system, comprising:

a host;

a peripheral device;

means for storing configuration data external to said host; and a host adapter integrated circuit operatively coupled to said peripheral device via a first bus, said host adapter integrated circuit comprising:

a first terminal;

a second terminal;

a shift register having a clock input lead, a serial data input lead, and a plurality of parallel data output leads, said clock input lead being coupled to said first terminal, said serial data input lead being coupled to said second terminal, said second terminal being coupled to said means for storing configuration data such that configuration data is output from said means and onto said second terminal under control of said host adapter integrated circuit after a power up condition without said configuration data passing into or out of said host; and a system bus interface operatively coupled to said host via a second bus.

6. The system of claim 5, wherein said host adapter integrated circuit further comprises:

a multiplexer having a plurality of first input leads, a plurality of second input leads, a plurality of output leads, and a select input lead, each of said plurality of first input leads of said multiplexer being coupled to a corresponding one of said plurality of parallel data output leads of said shift register.

7. The system of claim 6, wherein configuration data on said plurality of output leads of said multiplexer is accessible from said system bus interface.

8. The system of claim 7, wherein said host adapter integrated circuit further comprises:

a decoder having a plurality of input leads and an output lead, said plurality of input leads of said decoder being coupled to said plurality of parallel data output leads of said shift register, said output lead of said decoder being coupled to said select input lead of said multiplexer.

9. The system of claim 5, wherein said clock input lead of said shift register is coupled to said first terminal via an output buffer of said host adapter integrated circuit.

10. The system of claim 5, wherein said first terminal is an output terminal of said host adapter integrated circuit.

11. The system of claim 5, further comprising a light emitting diode (LED) coupled to said first terminal.

12. The system of claim 5, wherein said means for storing has a clock input terminal coupled to said first terminal of said host adapter integrated circuit, and wherein said means for storing has a serial data output terminal coupled to said second terminal of said host adapter integrated circuit.

13. The system of claim 5, wherein said host adapter integrated circuit further comprises:

a third terminal coupled to receive a reset signal; and a fourth terminal coupled to receive a clock signal.

14. The system of claim 5, wherein said first bus is a SCSI bus and said second bus is a PCI bus.

\* \* \* \* \*